United States Patent [19]

Shtayer et al.

[11] Patent Number: 5,491,691
[45] Date of Patent: Feb. 13, 1996

[54] METHOD AND APPARATUS FOR PACING ASYNCHRONOUS TRANSFER MODE (ATM) DATA CELL TRANSMISSION

[75] Inventors: Ronen Shtayer, Tel-Aviv; Naveh Alon, Ranat Hashnron; Joffe Alexander, Rehovot, all of Israel

[73] Assignee: Motorola, Inc., Schaumburg, Ill.

[21] Appl. No.: 291,225

[22] Filed: Aug. 16, 1994

[51] Int. Cl.⁶ .......................... H04L 12/433; H04Q 11/04
[52] U.S. Cl. .......................... 370/61; 370/85.4; 370/85.6; 370/94.2
[58] Field of Search ............................ 370/54, 58.1, 58.2, 370/58.3, 60, 60.1, 61, 85.1, 85.2, 85.3, 85.4, 85.5, 85.6, 85.7, 85.8, 94.1, 94.2, 112, 118; 340/825.05, 825.5, 825.51, 825.52

[56] References Cited

U.S. PATENT DOCUMENTS

| | | | |
|---|---|---|---|
| 4,459,588 | 7/1984 | Grow | 370/85.5 |
| 4,663,748 | 5/1987 | Karbowiak et al. | 370/85.5 |
| 4,930,121 | 5/1990 | Shiobara | 370/85.4 |
| 5,043,981 | 8/1991 | Firoozmand et al. | 370/85.6 |
| 5,119,374 | 6/1992 | Firoozmand et al. | 370/85.6 |
| 5,268,896 | 12/1993 | Pauwels | 370/60 |
| 5,381,413 | 1/1995 | Tobagi et al. | 370/85.6 |

*Primary Examiner*—Alpus H. Hsu
*Attorney, Agent, or Firm*—Keith E. Witek

[57] ABSTRACT

A method for scheduling asynchronous transfer mode (ATM) data cells for transmission in an ATM system uses a plurality of queues. The plurality of queues are separated into waiting queues of a lower priority and transmit queues of a higher priority. ATM tokens which identify one active channel a piece are positioned in the queues and rotated/shifted to new positions over time. As time progresses, ATM tokens are shifted/rotated from waiting queues of a lower priority to transfer queues of a higher priority wherein the tokens (and therefore specific ATM channels) are selected and ATM data cell(s) are transmitted in response to the selection. This queued/shifted selection process ensures that bandwidth requirements are adhered to in the ATM system. The selected tokens are eventually (after all needed ATM data cell(s) are transmitted for a single selection) re-scheduled to a queue of lower priority.

30 Claims, 10 Drawing Sheets

METHOD AND APPARATUS FOR PACING ASYNCHRONOUS TRANSFER MODE (ATM) DATA CELL TRANSMISSION

FIELD OF THE INVENTION

The present invention relates generally to data processing systems, and more particularly, to pacing mechanisms in an asynchronous transfer mode (ATM) communication system.

BACKGROUND OF THE INVENTION

The asynchronous transfer mode (ATM) protocol and system are used to communicate data cells over potentially large distances. The transmitting of these data cells, due to the large distances, is more economically sent by sending information for multiple channels through a single physical communication line. Efficient and effective time multiplexing into this single physical communication line is therefore a important criterion in ATM design. In addition, the time multiplexing should be able to compensate for many different active ATM channel which may have a large variance of bandwidths and transmit criterion. Therefore, a method and apparatus for efficient and effective time multiplexing and/or data cell transmission scheduling in an ATM system is desired.

Figure 1:
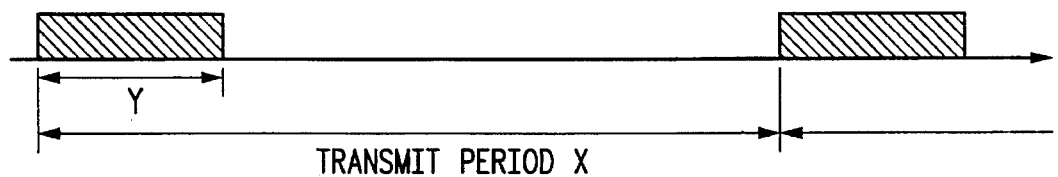
FIGS. 1–2 each illustrate, in a timing diagram, a serial stream of ATM data received by an ATM data processing system in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

Disclosed herein is a pacing mechanism for transmitting asynchronous transfer mode (ATM) data cells in an asynchronous transfer mode (ATM) system. The pacing mechanism is one of the most important parts of ATM interface controller. The goal of this pacing mechanism is to provide an efficient multiplexing between transmit channels which are in a plurality of transmit channels so that each one of the channels in the plurality is able to get the required bandwidth. Channels may sometimes be referred to as virtual paths and/or virtual connections.

When pacing the transmission of ATM data cells on a physical line, several factors should be taken into account:

the large number of transmit channels (few tens of channels or more)

the bandwidth required for each channels may vary (like in case of Variable Bit Rate transmission) from one Data Unit to another.

the bandwidth required for different channels may vary in a very wide range (e.g. some channel may require as much as 20 MBit/Sec when another channel may require a little as 64 KBit/Sec.).

Furthermore, the nature of real time data (such as video data and audio data) is such that Data Units or ATM data cells should be transferred during some period of time. Digital data sent for use as data on video screens needs to be updated roughly 30 times a second to achieve good picture quality for a human viewer. Each screen (of which their are 30 per second) may require tens of thousands of bits or bytes to produce, even if the screen is only black and white. This data cannot be transferred slow or picture quality will suffer and in real-time, some data will be lost. Therefore, in some cases, when the Data Unit or ATM data cell is not delivered on time its data has no meaning or is not useful. In the same manner, sound which requires typically 20 Hz to 20 KHz resolution would not be audible or useful if transmitted at low frequencies. Even though data needs to be sent in a timely manner, the transmission lines are so fast that time multiplexing can be used to transmit multiple data streams.

FIG. 1 illustrates that if the data for a given channel is sent all at once, the channel will take a maximum bandwidth to itself although the average bandwidth required is much smaller. This may cause congestion problems in a Destination Node and in various switches along the transmit route. This congestion will in turn cause data loss which is undesirable.

Figure 2:
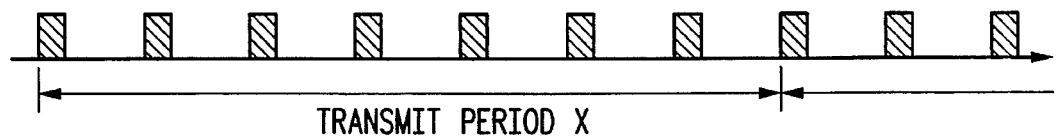

FIG. 2 illustrates that a transmission, in order to be current and timely, need only transmitted in cells or brief/intermittent bursts of data which are intermittent in time. Therefore, the transmission illustrated in FIG. 1 may be "broken up" into smaller data portions and transmitted (still within the transmit period X) within the transmit period X. In FIGS. 1 and 2, by the 3nd of the transmit period X, the same amount of data is transmitted but FIG. 2 offers more advantages. In FIG. 2, a physical line may be set up to have a transmit period of X wherein one channel only requires X/N of this time period X wherein N is a positive finite integer or positive fractional value greater than one. Normally, the X period of time is a few times larger then a time X/N required to transmit the data by the high speed media or physical line.

Therefore, in order to reduce the error probability (and increase the quality of the communication link), the preferred manner of transmission is as depicted in FIG. 2., i.e., the entire Data Unit (a plurality of data cells) is spread equally over an entire period X.

The Bandwidth required by the channel in this case will be Frame Length Y divided by transmit period X. In case of Variable Bit Rate applications (e.g. Coded Video), the transmit period remains constant while the Frame length may vary from few hundreds bytes to few tens of kilobytes. In the case when only one channel exists, it is easy to spread its transmission over time, however, if many channels should be transmitted, with various average bandwidth for each of them, the multiplexing of channels become a problem. In other words, the multiplexing of many channel onto a single line becomes very complex as the number of channel increases and the frame lengths vary in size.

Figure 3:
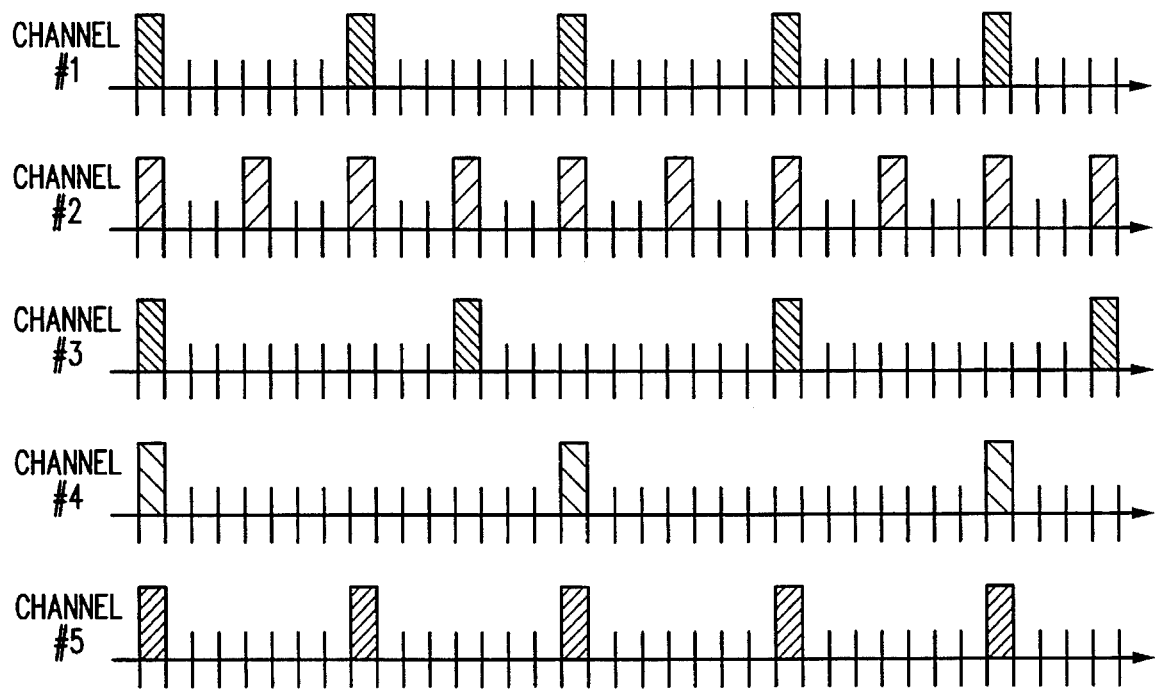
FIG. 3 illustrates, in a timing diagram, a serial stream of ATM data received by five different ATM data processing system channels in accordance with the present invention.

FIG. 3 illustrates five channels which are to be sent on a single physical line. The five channels are active at the same time and need ATM data to be sent at various points in time at a certain bandwidth. Each channel is requiring its bandwidth (as a portion of a total media bandwidth) as following:

Channel #1—⅛ (i.e. X/N=⅛)
Channel #2—¼
Channel #3—1/12
Channel #4—1/16
Channel #5—⅛

The total bandwidth required is a sum of all channels, i.e. the total bandwidth in our case will be 31/48=0.65 of media bandwidth. This means that when all channels are multiplexed, that some "dead" space or gaps in the transmission will still exist. These gaps could be used to make more channel active as time progresses. The problem is however, to multiplex between channels efficiently. One of the possibilities for multiplexing the five channels illustrated in FIG. 3 is illustrated in FIG. 4.

Figure 4:
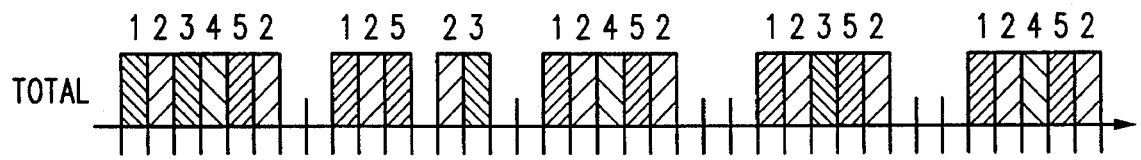
FIG. 4 illustrates, in a timing diagram, the channels of FIG. 3 communicated on the same ATM physical media in accordance with the present invention.

In FIG. 4, the five channels of FIG. 3 have been shifted/manipulated in time to allow all channels to be sent on the one physical without compromising the data bandwidth. The channels which correspond to the various data portions in the graph are listed along the top of the FIG. 4.

The algorithm for doing this type of time multiplex is now discussed. First, divide the entire transmit period into a number of relatively small basic cycles (we will call it TCP—Transmit Cycle Period). In our example, TCP equals 4 (i.e. the basic cycle is a time of transmission of four cells, see FIG. 5). Therefore, the bandwidth required for each channel may be expressed in a number of TCPs per one cell transmission of the channel. This number will be called TPN—transmit period number (see FIG. 5). TPN is usually a numerical constant for each channel as indicated in the table below. In some cases, TCP can be chosen as the minimum separation encountered on the five channels (see channel #2 in FIG. 3 which has the minimum separation of 4 resulting in TCP=4 and TPN for channel #2=1). In another form, the TCP value is limited by the minimum bandwidth since the TPN should not be larger than the number of waiting queues.

Figure 5:
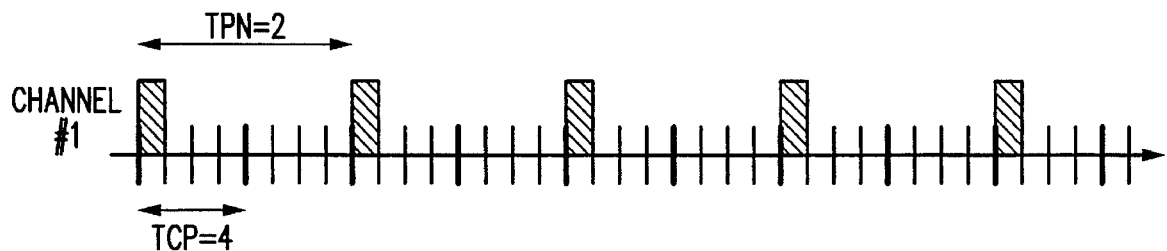
FIG. 5 illustrates, in a timing diagram, some ATM parameters which are in accordance with the present invention.

Therefore, in our example in FIG. 3–5, the five channels will have the following values of TPN (the value of TCP is 4 and it is common to all the channels):

Channel #1—TPN=2
Channel #2—TPN=1
Channel #3—TPN=3
Channel #4—TPN=4
Channel #5—TPN=2

In order to implement a multiplexing between channels, 12 queues or storage structures are defined (see FIG. 3.*b*). Many data structures exist in the art such as trees, linked lists, arrays, queues, stacks, FIFO buffers, LIFO buffers, and the like and any of these structures may be used to form the storage structures discussed herein. In another form, any other number of queues besides 12 may be used. For example, 16 queues or 24 queues may be used instead of 12 queues.

Figure 6:
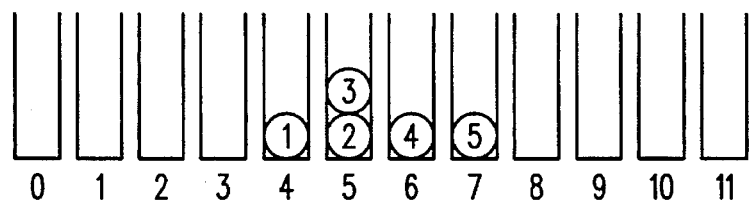
FIGS. 6–18 each illustrate, in a block diagram, the queuing and movement of ATM tokens in ATM data processing system to enable ATM data transferring in accordance with the present invention.

FIG. 6 illustrates the 12 data structure (queues) discussed above. Each queue may store a number of tokens, where each token represents a transmit channel (#1 through #5 in the above example, although any number of channels may be active). For ease of explanation, assume that each token is relative to one ATM cell transmission, although each token may indicate more than one ATM data cell transmission.

The basic algorithm is as following:

1. In order to know what channel will be serviced by the following ATM cell space, the channel token is taken from a queue with lowest number. Therefore, tokens in queue #0 will be taken first then queue #1, followed by queue #2, etc. Only one token may be taken every cell time (i.e., one cell transmitted per one cell space/gap available).

2. In most of the examples included herein, the first four queues (#0, 1, 2, and 3) are used for transmission during TCP although any number of queues (two, five, eight, etc.) can be used as transmit queues. It is important to note that the use of eight queues is desired but not required and that another number may be set. Therefore, if the time period of TCP is not finished, but there is no tokens in first eight queues, the rest of the TCP will be filled by unassigned cells (i.e. blank transmissions or gaps).

3. When a token is taken from one of the queues, and the cell is assigned to the channel represented by this token, the token will be re-scheduled (linked to the end of a queue) to one of the queues. The number of the Queue to which the token is re-scheduled is defined by a simple algorithm as following:

$NQN=CQN+TPN$ wherein NQN is Next Queue Number, CQN is Current Queue Number and TPN is a Transmit Period Number of this channel.

4. At the beginning of each TCP, all queues are rotated (shifted) one place left, i.e. Queue #1 will become #0, #2 goes to #1 etc. (Queue #0 will take place of the last queue (#11) when rotated). Then for a new period of TCP, the same transmission algorithm will start all over again (i.e. Tokens in the frontmost queues will be serviced).

5. A token for each channel is initially linked to a queue using an algorithm to place the token in a queue identified by the formula TPN+constant (where constant represents the highest queue used for transmission) in one example. Other initial placement algorithms may be used.

TPN can be variable or is usually a constant value determined by bandwidth as discussed herein.

Figure 7:
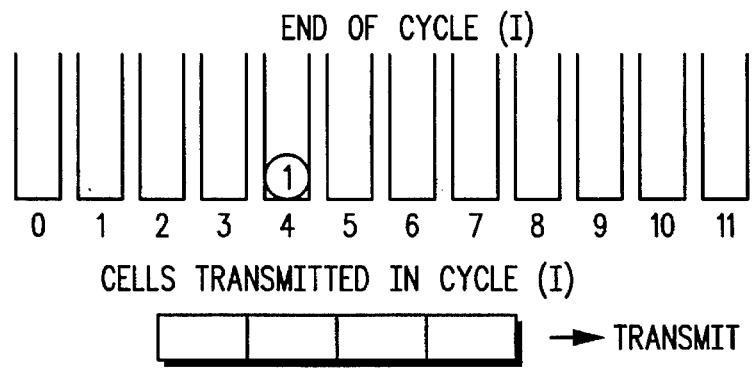

A simple example is illustrated via FIG. 7 before the example from FIGS. 3–5 is graphically illustrated in more detail (in FIG. 7, TCP=4 as illustrated). Therefore, the algorithm is first demonstrated in FIG. 7 using an ATM example wherein only channel #1 exists (and no channels #2 through #5 exist).

The Channel #1 Token is placed inside Queue #4 during TCP Cycle (i) and cells which arrive within the lowest four queues (queues #0 through #3) are possible candidates for transmission. Note that there are no other channels to transmit, therefore all cells in Cycle (i) will not be used (i.e., there will be many "gaps").

Figure 8:
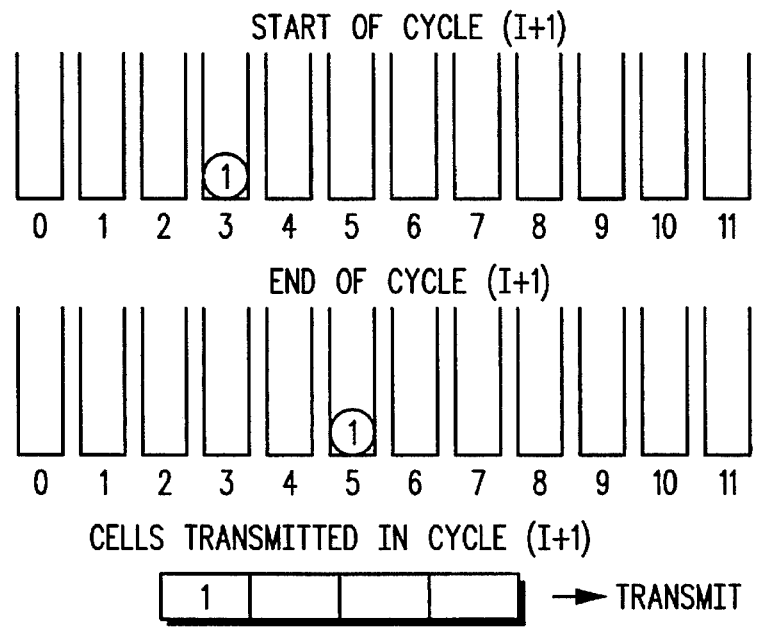

At the start of cycle (i+1) in FIG. 8, queues are shifted left, i.e. Queue #8 becomes #7, and so on. Since there are no other tokens in Queues 0 to 3, no cells are transmitted and the Channel #1 Token will be extracted from the Queue #4 and shifted to Queue #3 when the data for the first cell in Cycle (i+1) is prepared. Therefore, the first cell (the first cell out of four cells since TCP=4) in the cycle (i+1) will be used by Channel #1 since it is located in queue #3. In other words, the channel #1 token will be removed from queue #3 (the token for channel #1 was just shifted from queue #4 to queue #3 as illustrated) and an ATM data cell for channel #1 will be transmitted. The token for channel #1 is then re-scheduled for subsequent transmissions. After an extraction from the queue, the Token is rescheduled into the queue #5 (CQN=3, TPN=2, and CQN+TPN=5) (see FIG. 8).

The rest of the TCP will not be used because there are no more tokens in Queues 0–3.

Figure 9:
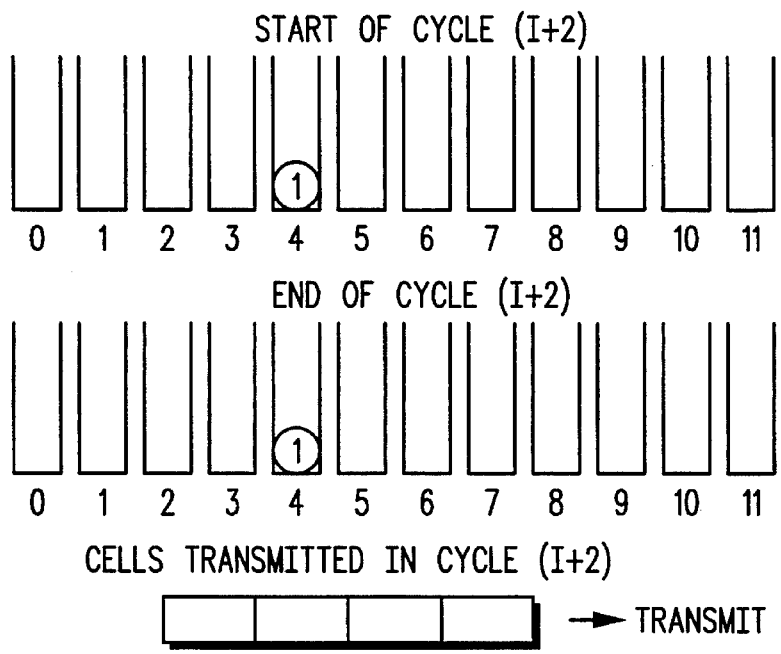

At the beginning of the Cycle (i+2) all the queues are shifted one place as shown in FIG. 9. This cycle will once again not use/transmit any cell because there are no tokens in Queues 0–3. In other words, four "gaps" will exist in the physical transmission line in this case.

Figure 10:
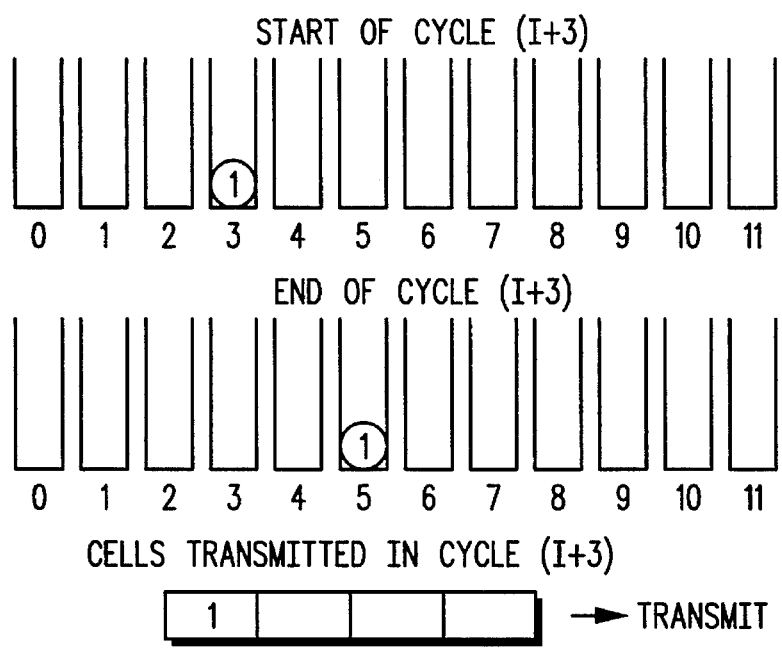

The next cycle (i+3) illustrated in FIG. 10 will be similar to cycle (i+1) as shown in FIG. 8 herein. The token for channel #1 will be located in one of the transmit queues 0–3 and will be an ATM data cell will be transmitted for channel #1 and the token for channel #1 will be re-scheduled to the queue 5 due to the condition (CQN+TPN=3+2=5).

Figure 11:
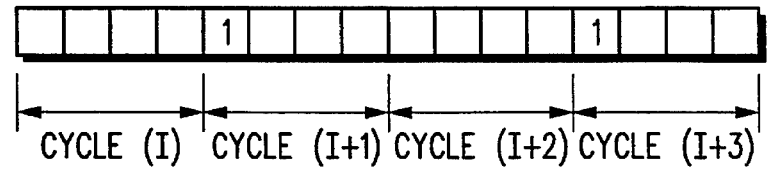

It is clear from this example, that the Token for channel #1 (in this case) will be always extracted from queue #3 to send an ATM data cell, be re-scheduled to queue #5 and propagate with the shifting of the queues until it resides again queue #3, and so on in a looping manner. Therefore, in this simple case, the Channel #1 will get ⅛ of bandwidth, i.e., it will be assigned to one cell per every 8 cells transmitted as shown in FIG. 11. If FIG. 11 is compared with FIG. 5 or channel #1 of FIG. 3, it is clear that the ATM data for channel #1 is being sent in a proper manner (i.e., proper bandwidth or frequency). Therefore, this queuing, shifting, and re-scheduling algorithm is illustrated as being functional for the trivial case of having one active channel per ATM line.

Figure 12:
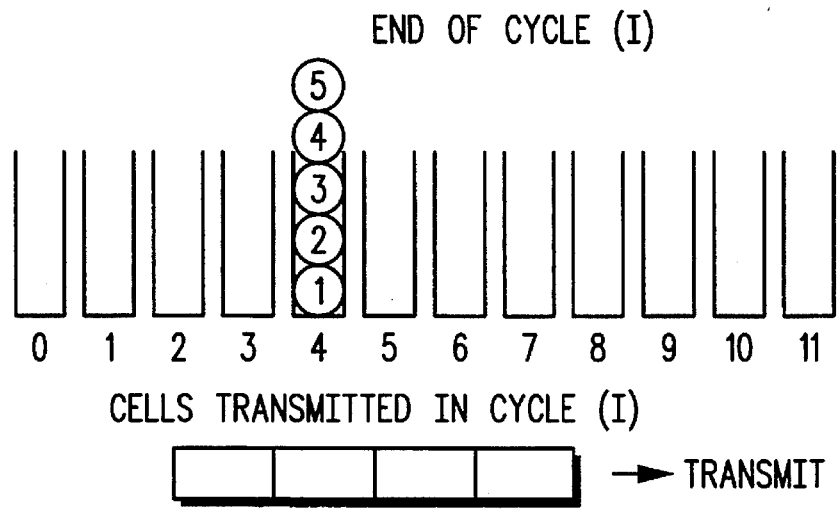

In a more complex example, this above algorithm works equally as well in an ATM system. FIG. 12 begins the next example, which uses the five channels illustrated in FIG. 3. The Cycle by Cycle diagrams are shown in FIGS. 12–19. All five channels are re-scheduled in queues according to their TPN numbers and the tokens are initially placed in a queue one above the upper-most queue which can be transmitted from. In other words, since transmission occurs when tokens reside in queues 0–3, queue 4 is used as an initial placement for the tokens. It is once again important to note that instead of transmitting from queues 0–3, any number of queues such as 0–2 or 0–7 may be used, but for ease of illustration, queues 0–3 are used herein. The example begins with the placement of the tokens in queue #4 in a cycle (i).

Figure 13:
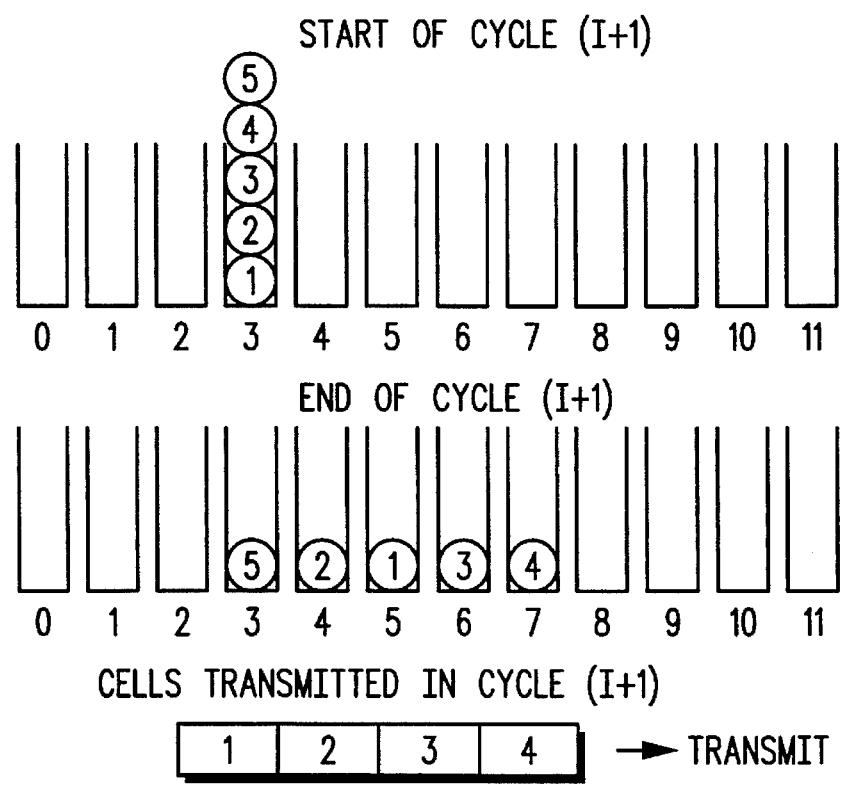

In the cycle (i+1) of FIG. 13 all tokens are shifted left into another queue, for example queue #8 become queue #7 and so on. Since TCP=4, four cells which each correspond to four tokens in the queues 0–3 may be transmitted. Since queues are used, if greater then four tokens are positioned in one queue in the queues 0–3 the tokens are selected in a first-in-first-out (FIFO) or bottomfirst manner. Therefore, in FIG. 13 the tokens #1 through #4 are removed, an ATM data cell corresponding to each of the tokens #1 through #4 are transmitted in the order illustrated in FIG. 13 and re-scheduled according to the formula NQN (new queue number)=TPN+CQN (current queue number). These calculations are as follows:

Channel #1—TPN=2, CQN=3→NQN=5
Channel #2—TPN=1, CQN=3→NQN=4
Channel #3—TPN=3, CQN=3→NQN=6
Channel #4—TPN=4, CQN=3→NQN=7

The new queue placements after selection and transmission are illustrated in FIG. 13. Note that since token #5 was a fifth token, due to the FIFO output of tokens, token #5 was not transmitted in this TCP=4 structure.

Figure 14:
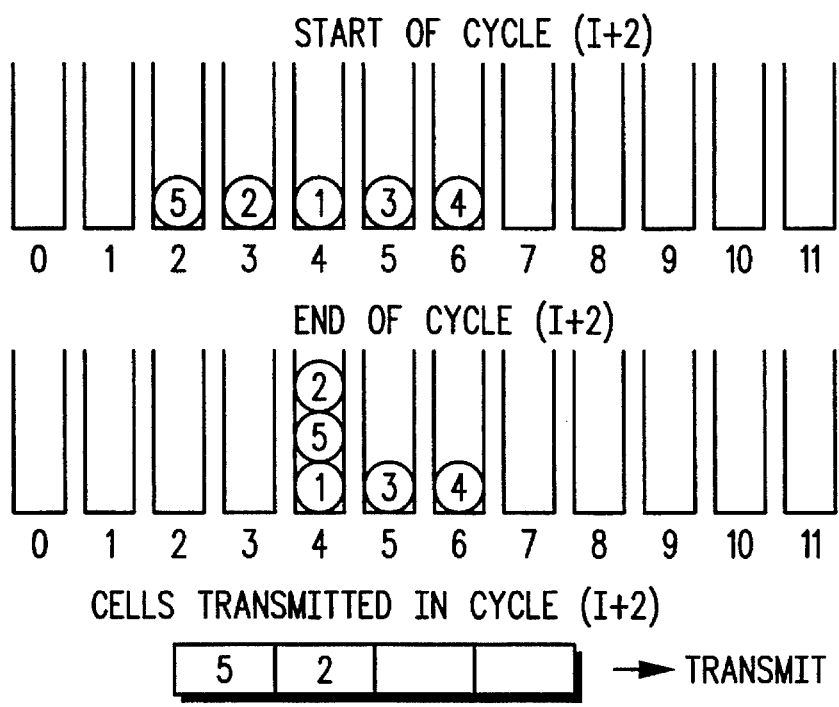

FIG. 14 illustrates a cycle (i+2). All queues are shifted one place left. Now Channels #5 and #2 are within the transmit queues #0–#3. In this case, token is lowest numbered queues are selected first (i.e., token #5 is chosen for ATM data transmission before the token #2 is chosen). The ATM data cells for channel #5 then channel #2 are transmitted and the tokens #5 and #2 are re-scheduled. Note that the cycle (i+2), wherein TCP=4, transmits two "gap" cells after the ATM data cells corresponding to channels #5 and #2 since only two tokens out of a maximum of four where positioned in the transmit queues 0–3. Re-scheduling occurs as follows:

Channel #2—TPN=1, CQN=3→NQN=4
Channel #5—TPN=2, CQN=2→NQN=4

Figure 15:
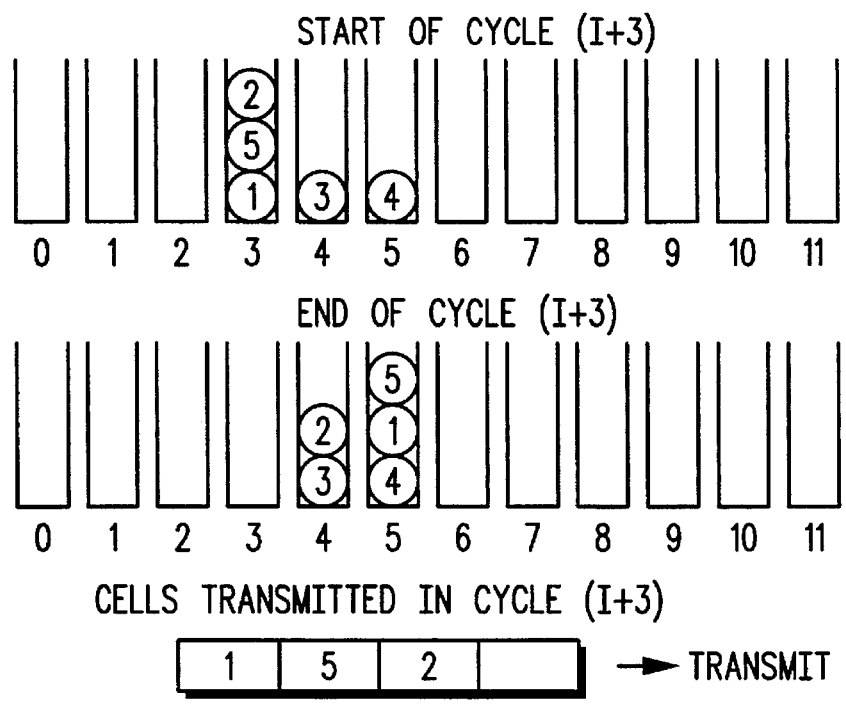

FIG. 15 illustrates a cycle (i+3). After queues are shifted one place, the transmission is from queues #0 to #3 in FIFO order of the tokens in these queues. Therefore, during this period Channels #1, #5, and #2 transmit a corresponding ATM data followed by one "gap" or empty cell. Re-scheduling of tokens #1, #2, and #5 are as follows:

Channel #1—TPN=2, CQN=3→NQN=5
Channel #2—TPN=1, CQN=3→NQN=4
Channel #5—TPN=2, CQN=3→NQN=5

Figure 16:
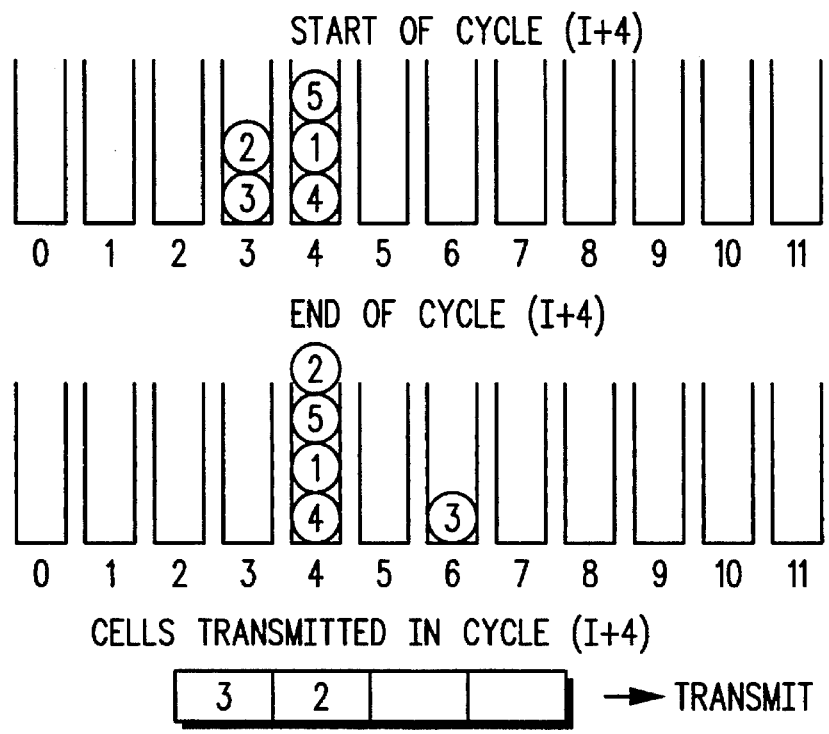

FIG. 16 illustrates a cycle (i+4). During this cycle Channels #2 and #3 will get one cell each and will be rescheduled as follows:

Channel #2—TPN=1, CQN=3→NQN=4
Channel #3—TPN=3, CQN=3→NQN=6

Figure 17:
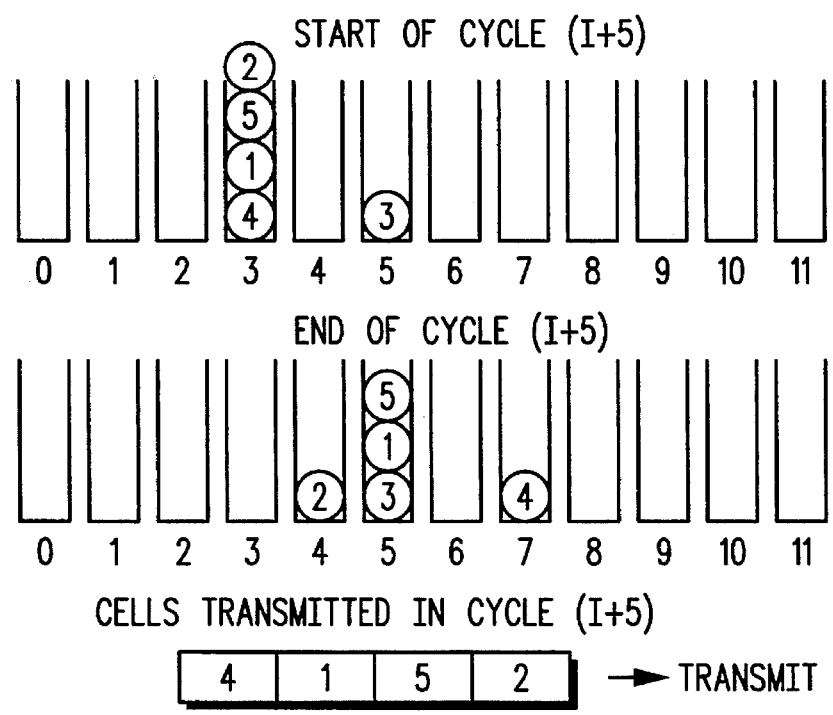

FIG. 17 illustrates a cycle (i+5). During this cycle Channels #4, #1, #5, and #2 will get one ATM cell space each for ATM data transmission and will be re-scheduled as follows:

Channel #4—TPN=4, CQN=3→NQN=7
Channel #1—TPN=2, CQN=3→NQN=5
Channel #5—TPN=2, CQN=3→NQN=5
Channel #2—TPN=1, CQN=3→NQN=4

Figure 18:
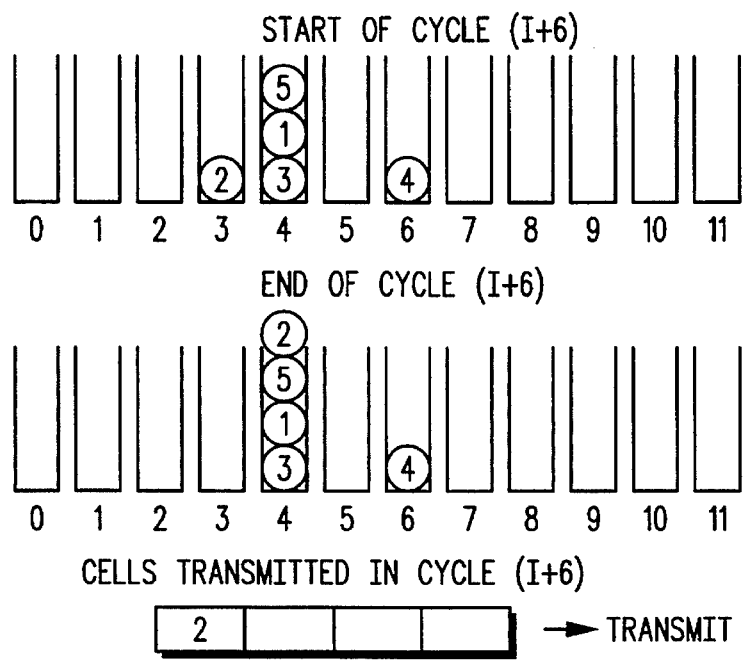

FIG. 18 illustrates a cycle (i+6). These cycles will go on for as long as the channels #1 through #5 remain active. Note that some channels #1 through #5 may be deactivated at any time or one ore more additional channels may be added to channel #1 through #5 during the course of data transmission. During the cycle illustrated in FIG. 18, only channel #2 will get an ATM data cell transmitted and will be rescheduled as follows:

Channel #2—TPN=1, CQN=3→NQN=4

Figure 19:
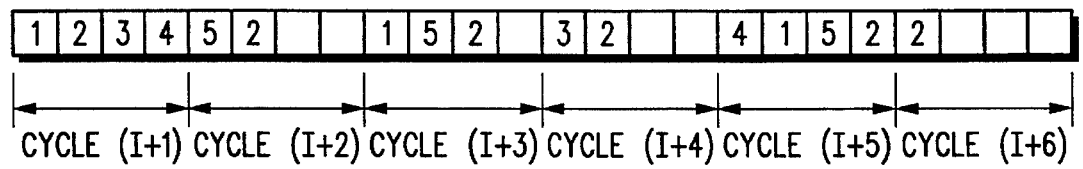
FIG. 19 illustrates, in a timing diagram, a serial stream of ATM data which results from the cycling queue structures illustrated in FIGS. 6–18.

For the cycles (i) through (i+6), the serial stream of ATM data cells transmitted along the ATM physical line are illustrated in FIG. 19 for a TCP=4. It is also important to note that the TCP may be set to another number but TCP=4 was used for ease of illustration. By comparing each cell transmission for each channel to the requirements outlined in FIG. 3, that the bandwidths are adhered to using the above algorithm. For instance, channel #2 has a data transmission every four TCPs, and the time between data cell transmission is largest for channel #4 as is proper. Therefore, this example illustrates an algorithm which multiplexes efficiently between a number of channels wherein the smoothing is provided for each channel. The existence of several active queues (#0 to #11, which can vary for other applications) and the rotating of the queues effectively handle the condition where several channels request transmission at the same time.

The examples used above in FIGS. 3–19 used the fact that one ATM data cell was transmitted per selection of the token from a queue. In practice this may not always be the case. Therefore, FIGS. 20–25 illustrate how an ATM system can be implemented using the above algorithm when transmission of ATM burst cells is required.

Figure 20:
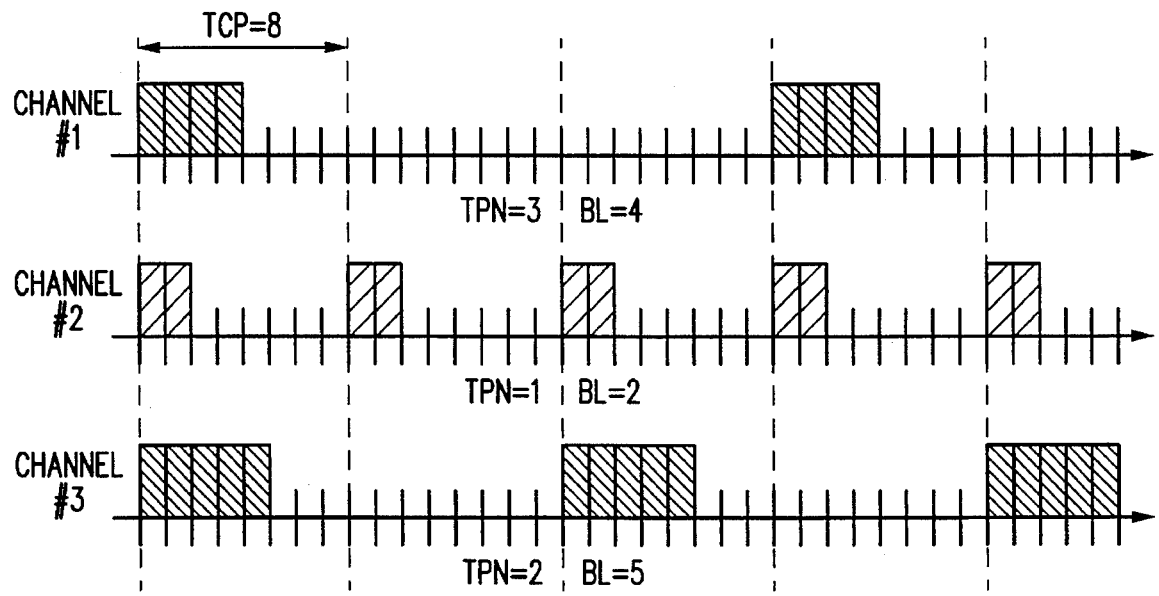
FIG. 20 illustrates, in a timing diagram, a plurality of channels for sending/receiving ATM data cells wherein a burst mode is used in accordance with the present invention.

FIG. 20 illustrates three channels. Each channel may request transmission a burst of cells during the same TCP cycle. In this case after one cell is transmitted, this transmitted channel will be rescheduled to the same transmit queue to allow subsequent (burst) transmission to occur. This technique will give another channel an opportunity to transmit between cells of this bursting channel and therefore reduce the peak bandwidth of the channel. If there are few bursting channels in the same queue, their cells will be mixed. However, if there are no other channels to transmit from the queue, the cells of the burst will be sent one after another until TCPs are exhausted.

This operation of rescheduling to the tail of a queue (and not rescheduling to another higher queue as illustrated in FIGS. 10–19) will continue until the entire burst is transmitted. Then, this channel will be rescheduled according to its TPN number as illustrated above in FIGS. 10–19). If during the TCP, a channel did not complete its burst, the channel would try to complete the burst during the following TCP. Therefore, a burst transmission may cross TCP boundaries and still be properly transmitted.

FIG. 20 depicts three channels with different Burst Length (BL) specification as well as different bandwidths. The total bandwidth required for all the channels in this example is 73% of the media bandwidth and therefore some "gaps" will exist in the serial stream of ATM cell transmission.

Figure 21:
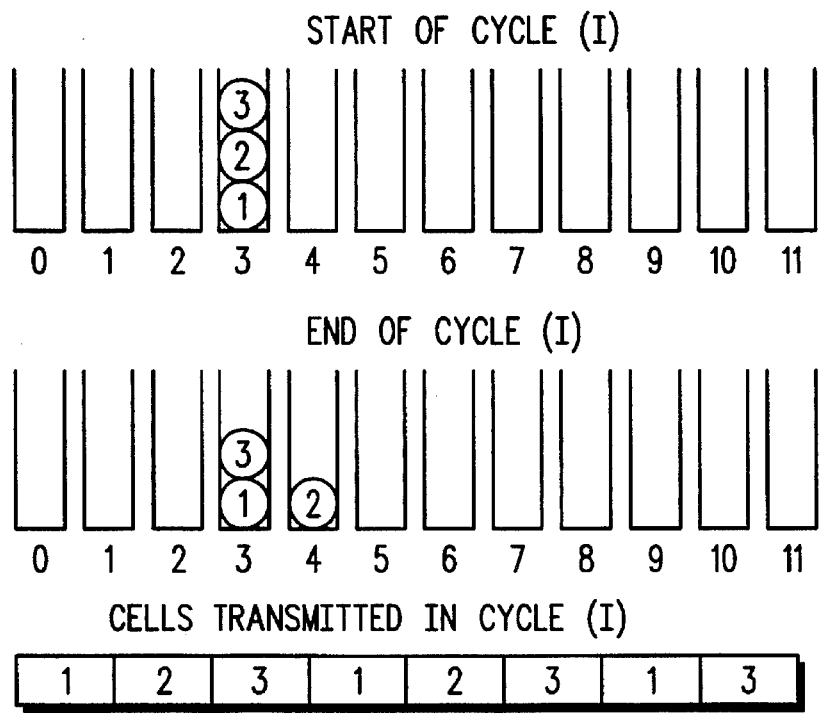
FIGS. 21–24 each illustrate, in a block diagram, the queuing and movement of ATM tokens in ATM data processing system to enable ATM burst data transferring in accordance with the present invention.

As illustrated previously herein, FIG. 21 illustrates twelve queues wherein queues 0–3 are the transmit queues. FIG. 21 illustrates the first point in time during operations herein transmitting is required. In this case, all three tokens will reside in the queue #3 as illustrated at the start of the cycle in FIG. 21. For the illustration of FIGS. 21–25, a TCP=8 is used. First, token #1 is selected in a FIFO manner from queue #3 and a channel #1 ATM data cell is transmitted. Since, BL=4 for channel #1, the token is rescheduled to the top (end) of queue #3 for re-transmission of more burst cells. Token #2 is then selected and a channel #2 ATM data cell is transmitted. Since BL=2 for channel two, one more cell must be transmitted in the burst and therefore token #2 is placed in the top (back) of queue #3. Then, token #3 is chosen and an ATM data cell for channel #3 is transmitted in position 3 as illustrate in FIG. 21. This cycling, due to the fact that all of tokens #1 to #3 where re-scheduled to queue #3 is repeated to give another serial sequence of ATM cells corresponding to channel #1, #2, and #3 respectively in time. One difference is that when an ATM data cell is transmitted in position 5 of FIG. 21 for channel #2, the channel #2 (since BL=2) is done bursting and is rescheduled using NQN= CQN+TPN. This re-scheduling leaves only tokens #1 and #3 in the queue #3 so that positions 7 and 8 in FIG. 21 transmit for channel #1 and channel #3 respectively in time. Since BL=4 for channel #1 and only three cells were transmitted so far, channel #1 is rescheduled to the queue #3. Also, since BL=5 for channel #3 and only three cells were transmitted so far, channel #3 is rescheduled to the queue #3. Therefore, after the first cycle of transmitting, the queue structure is illustrated in FIG. 21 and labeled the end of the cycle.

Figure 22:
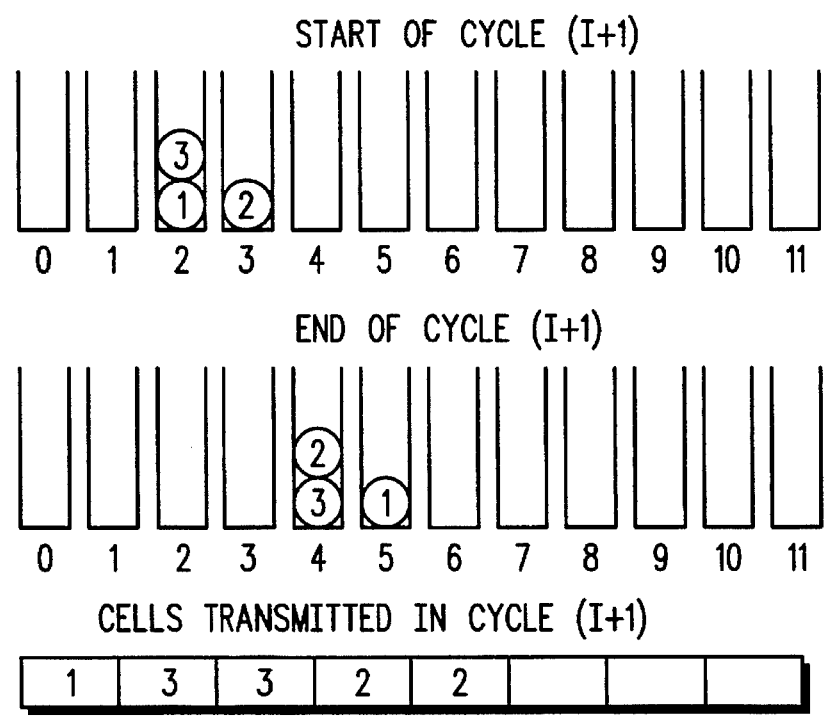

FIG. 22 illustrates that the queues from the end of cycle in FIG. 21 are shifted left by one queue. Then, token #1 is accessed. Since token #1 has now been accessed four times and BL=4, token #1 is re-scheduled according to NQN= CNQ+TPN (re-scheduled to queue #5). This leaves only token #3 in queue #2. Since queue #2 is fully emptied before queue #3 is accessed, two ATM data cells are transmitted from queue #2 until BL=5 is satisfied for the channel #3. Channel #3 is then rescheduled (since 5 cells were burst transmitted in FIGS. 21–22 and BL=5 for channel #3) using NQN=CNQ+TPN. Then, the queue #3 is accessed since queue #2 has been emptied. Since BL=2 for channel #2 and only two is located in queue #3, two ATM data cells are sent one after another for channel #2 as illustrated in FIG. 22. Token #2, since BL=2 is then re-scheduled using NQN= CNQ+TPN. Since the queues #0–#3 re now empty "gap" cells or empty cells are transmitted in all remaining TCPs in FIG. 22.

Figure 23:
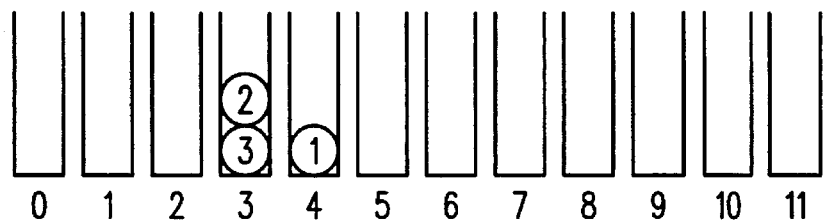
Figure 23:
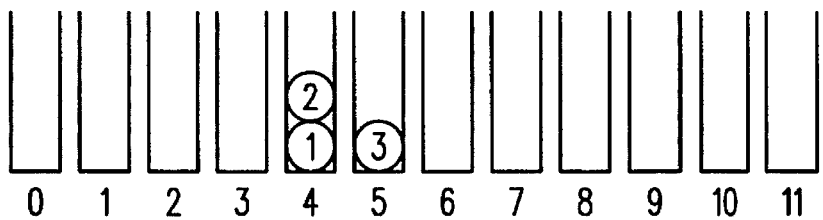
Figure 23:
Figure 24:
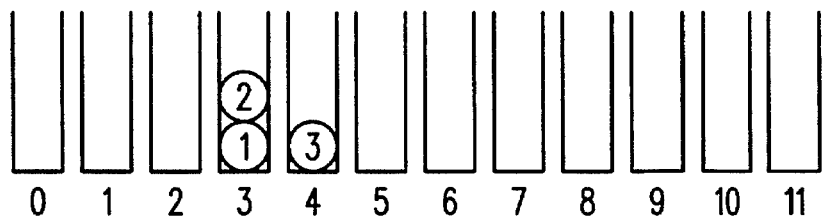
Figure 24:
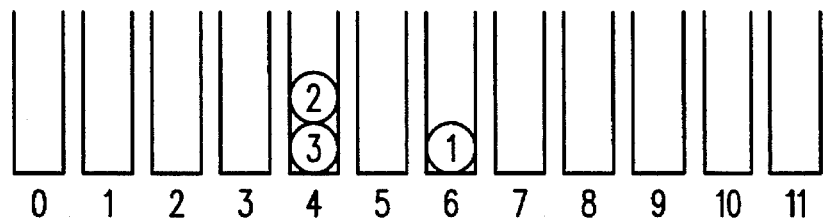
Figure 24:

FIGS. 23–24 continue sending burst cells in the manner discussed above.

Figure 25:
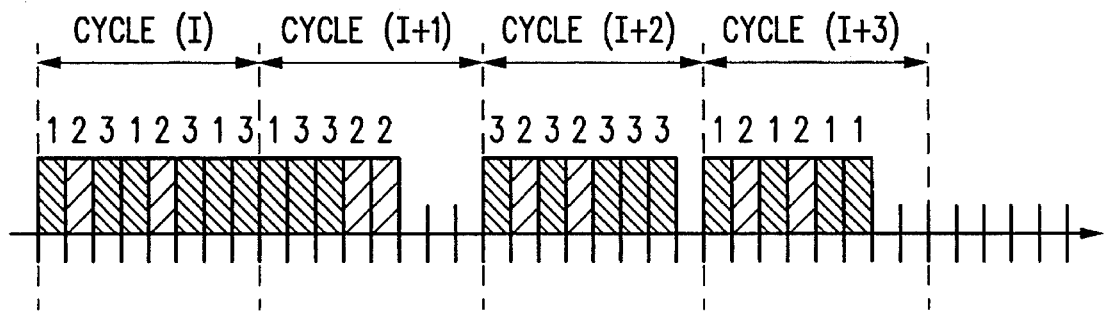
FIG. 25 illustrates, in a timing diagram, a serial stream of ATM data which results from the cycling queue structures illustrated in FIGS. 21–24.

FIG. 25 illustrates the complete serial stream of ATM data cells which result given the algorithm/example discussed in FIGS. 20–24. The burst and bandgap requirement are adhered to closely when comparing FIG. 20 (the independent channels) to FIG. 25 (all channels sent across the same media).

The performance and correctness of the above algorithm is a function of proper choosing of a TCP value for the application. The TCP value is provided by a user and may have any value. Several factors should be taken into consideration in order to choose the right value of TCP. For example, for a given TCP, the minimum bandwidth supported is ⅛*TCP (1 cell each 8*TCP cells). Choosing too large of a value for TCP will cause the system to assign large bursts to High Band-width channels. This in turn will also require a large internal memory space requirement for this channel, and therefore be inefficient internal memory usage. In general, from the point of view of internal memory allocation (the amount of data stored temporary in the internal Data FIFO), small bursts are preferred. In addition, the TCP should be large enough to satisfy the total average number of requests from different channels in order to not cause bandwidth degradation in normal cases (no bandwidth overbooking).

For example, if the slowest channel has to have 0.1% of bandwidth, then the TCP value should be no less than 125 (125*8=1000) and the TPN value for this channel should be 8 and its Burst Length is 1. Therefore, channel with 20% of bandwidth in this case will have TPN equal to 1 and Burst Length equal to 25. Typically TCP will be between 4 and 256 and may be variable over time as channels are activated and deactivated.

The number of queues in our examples was chosen to be either 12 or 16 where half of them or less are Active Queues or transmit queues and another half or more are Waiting Queues. If the number of Active Queues is equal to the number of Waiting Queues, the mechanism will always satisfy requirements for all channels if the total Bandwidth is less or equal to the media bandwidth. The number of queues is an implementation tradeoff. Large number of queues will allow more fine granularity in channels bandwidth. It should be emphasized that the mechanism is not sensitive to a total number of channels supported by the application or to their bandwidth distribution.

Figure 26:
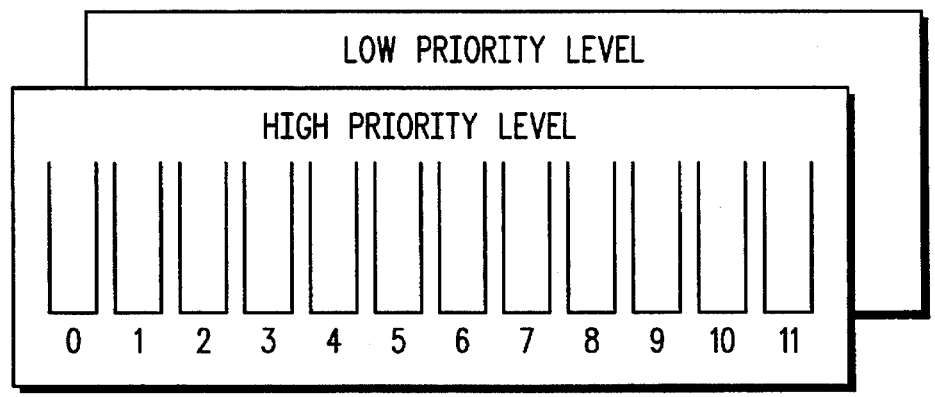
FIG. 26 illustrates, in a block diagram, a prioritized queue structure in accordance with the present invention.

In the above discussed algorithm, all channels are given the same opportunity to be transmitted. In other words, individual channels are not prioritized with respect to one another. This prioritization can be added as illustrated in FIG. 26. FIG. 26 illustrates that two sets of queues are set-up as discussed and illustrated in FIG. 6. One set of queues is used for a low priority and another set is high priority. In one manner, all transmit queues (queues 0–3 in the example of FIG. 6–19) are transmitted first starting with queue #0 and going to queue #3. Once all transmit queues in the highest priority structure are processed then the lowest priority is processed from queue #0 to queue #3. In another form, the priority may be set such that highest priority queue #0 is drained first, followed by lowest priority queue #0, followed by highest priority queue #1, followed by lowest priority queue #1, followed by highest priority queue #2, followed by lowest priority queue #2, followed by the queue #3 by priority. Therefore, priority may be one an entire queue structure basis or by queue number or both. It is also important to note that an N level priority scheme wherein N sets of queues exist may be created. In this cases, a system having 10 queues of differing priority is possible, for example. The high priority queues are accessed and exhausted before other queues are accessed. Therefore, in cases of bandwidth overbooking, you can expect degradation of each channel bandwidth. However, in real applications, some channels should suffer more than others and some should not be disturbed at all. This priority scheme allows a system designer or user to define that "this channel is not be compromised and must be sent as often as possible when possible, while these channels may be neglected to some extent."

In some cases, if overloading is occurring, a token is queue #0 will not be accessed and on the next shift/rotation will be shifted out of the structure to an internal monitor for investigation. After investigation, the token can be rescheduled in any queue as is desired by the monitoring code (may be a transmit queue or a waiting queue). In some cases this loss may be catastrophic and other events must then take place (one would be to reduce the number of active channels on that physical line). These channels which are investigated will suffer a temporary loss or data or temporary reduction in bandwidth. In practical application, the user may see this as a slowing of data transmission on a modem or interference in voice or video data. These occurrences are usually entirely avoided and are rare but sometimes unavoidable occurrences in a loaded system. In some cases, the monitoring code will stop the transmit once investigation is started since the absence of the investigated data is a fatal error and transmission must begin again from the start. This re-start may not be automatic and may require a user to re-send data.

Figure 27:
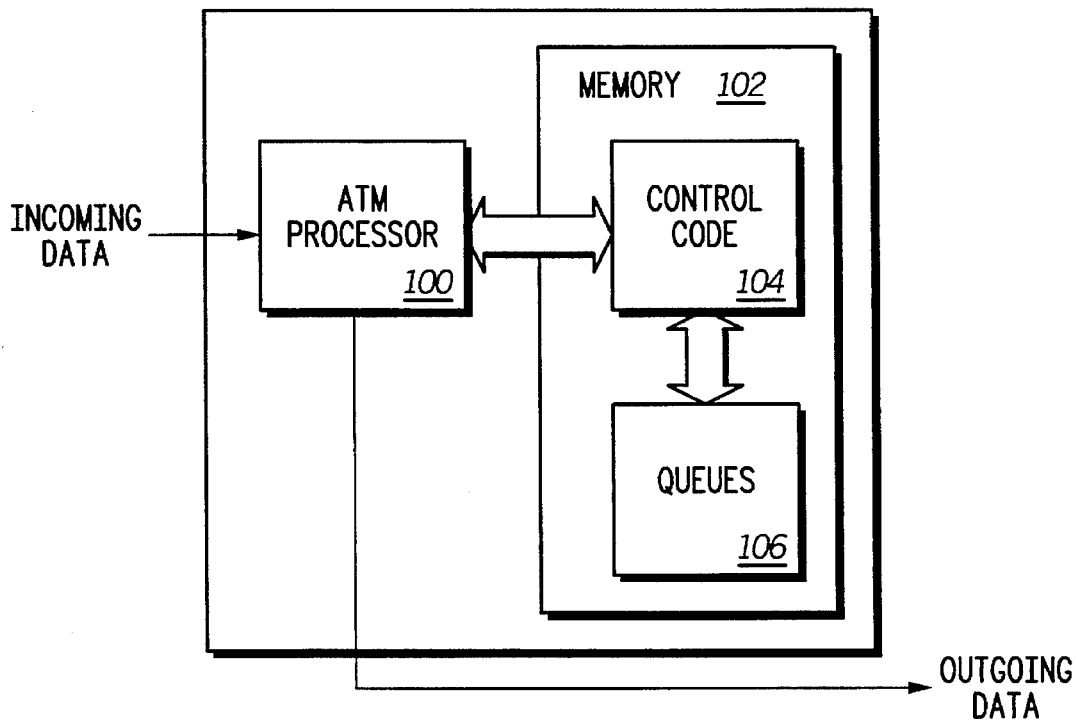
FIG. 27 illustrates, in a block diagram, an ATM system for performing the methods illustrated via FIGS. 6–25 in accordance with the present invention.

FIG. 27 illustrates an ATM system for performing the methods taught in FIGS. 5–25. FIG. 27 illustrates an ATM processor coupled to a memory unit 102. The memory unit contains the queues 106 which are illustrated in FIGS. 5–26. These queues 106 are manipulated in a manner as taught in FIGS. 5–26 by a control code program 104 which is resident in the memory 102. Data cells, corresponding to tokens or pointers which are manipulated in the queues as taught herein, are transmitted via the Outgoing Data line via one or more ATM channels as taught herein. An Implementation Example of a Pacing Mechanism using C code:

```
10  /*********************************************************************/
    #define    QUEUE_NUM        16      /* number of Queues              */
    #define    MAX_CH_NUM       ...     /* maximum number of channels    */
    #define    TCP              ...     /* TCP value                     */
    #define    MAX_CYCLE        ...     /* Number of TCP cycles to run   */
15
    typedef struct{                     /* definition of Channel parameters  */
        int        next_ch;             /* Link to Next channel, to form a Queue */
        int        cbl;                 /* Current Burst Length          */
        int        bl;                  /* Required Burst Length         */
20      int        tpn;                 /* TPN
        */
    }Channel;

typedef struct{                     /* definition of Queue parameters    */
25      int        cnt;                 /* Number of Channels in Queue
        */
        int        first;               /* Pointer to a First Channel of the Queue   */
        int        last;                /* Pointer to a Last Channel of the Queue */
    }Queue;
30
    Channel    channel[MAX_CH_NUM];     /* Channel Table                 */

Queue  queue[QUEUE_NUM];            /* Queues                        */

35  int        cycle,tcp_cnt;
```

```
/*------------------------------------------------------------------------------*/
/*                    Basic functions                              */
/*------------------------------------------------------------------------------*/
void add_to_queue(ch,queue)
int     ch;
Queue  *queue;
{
        if ((*queue).cnt==0) {
                (*queue).cnt=1;
                (*queue).first=ch;
                (*queue).last=ch;
                }
        else {
                channel[(*queue).last].next_ch = ch;
                (*queue).last = ch;
                (*queue).cnt++;
                }
}

/*------------------------------------------------------------------------------*/
void reschedule(ch,cur_queue)
int     ch, cur_queue;
{
        channel[ch].cbl++;
        if (channel[ch].cbl<channel[ch].bl)              /* If burst is not completed    */
                add_to_queue(ch,&queue[cur_queue]);      /* Link the channel to the end  */
                                                         /* of current Queue             */
        else {
                channel[ch].cbl=0;                       /* else Reschedule the channel  */
                add_to_queue(ch,&queue[cur_queue+channel[ch].tpn]);
                }
}

/*------------------------------------------------------------------------------*/
```

```
        int     find_act_queue(cur_queue)        /* Find next not empty Active   */
                                                 /* Queue                        */
        int     cur_queue;
        {
 5          int i;
            i=cur_queue;
            if (queue[i].cnt>0) return(i);

while((i<(QUEUE_NUM/2)) && (queue[i].cnt==0))
10              i++;
            return(i);
        }
/*-----------------------------------------------------------------------*/
        void    end_of_tcp()                     /* Rotate Queues at the end of  */
15                                               /* TCP cycle                    */
        {
            int     i;
            Queue   tmp;
            tmp =   queue[0];
20
            for(i=1;i<QUEUE_NUM;i++)
                    queue[i-1] = queue[i];

queue[QUEUE_NUM-1] = tmp;
25      }

/*-----------------------------------------------------------------------*/
        void start_up()
        {
30          int     i;

for(i=0;i<QUEUE_NUM;i++)             /* Queues initialization */
                    queue[i].cnt =0;

35          for(i=1;i<MAX_CH_NUM;i++) {          /* Schedule Channels initially   */
```

```
                    channel[i].cbl = channel[i].bl-1;    /* according to their TPN        */
                    reschedule(i,(QUEUE_NUM/2-1));
                }
        }
5
        /*================================================================*/
        /*                          Main program                                 */
        /*================================================================*/
        main()
10      {
                int     ch,flag,cur_queue;

start_up();                              /* Initialization                */

15              for(cycle=1;cycle<=MAX_CYCLE;cycle++)
                {
                cur_queue=0;
                flag=0;
                for(tcp_cnt = 0;tcp_cnt<TCP;tcp_cnt++)
20                      if (flag==0)                     /* Find next Channel to transmit */
                        {
                            cur_queue=find_act_queue(cur_queue);
                            if (cur_queue<(QUEUE_NUM/2))
                            {
25                              ch = queue[cur_queue].first;
                                queue[cur_queue].cnt--;
                                queue[cur_queue].first=channel[ch].next_ch;
                                reschedule(ch,cur_queue);
                            }
30                          else flag=1;                 /* No more Channels for this TCP */
                                                         /* Issue Unassign Cell           */
                        }
                        else    ;                        /* Issue Unassign Cell           */
                    end_of_tcp();                        /* Rotate Queues at the end of TCP */
35              }
```

```
        exit(0);
}
/**********************************************************************/
```

Plurality, as used herein, is intended to mean more than one within the range of 1<n<∞. Plurality, as used herein should not be limited to any particular constant or sub-range but should be interpreted as being any number n in the range of 1<n<∞ and is usually an integer.

While the present invention has been illustrated and described with reference to specific embodiments, further modifications and improvements will occur to those skilled in the art. queue size, data structures, order of transmission, bus sizes, and the like may vary depending upon the application. This pacing mechanism may also be used by other communication protocols or systems other than ATM systems. It is to be understood, therefore, that this invention is not limited to the particular forms illustrated and that it is intended in the appended claims to cover all modifications that do not depart from the spirit and scope of this invention.

What is claimed is:

1. A method for determining when in time to output a data cell onto a physical line in a communication system wherein the data cell corresponds to one channel in a plurality of channels, the method comprising:

(a) providing a plurality of storage structures ranging from a lower priority to a higher priority;

(b) providing the plurality of channels which are active channels and are used to transmit one or more data cells onto the physical line;

(c) creating one token for each active channel, the tokens being stored the plurality of data structures in a predetermined manner;

(d) shifting the tokens in the data structures from lower priorities to higher priorities;

(e) choosing a plurality of highest priority tokens in the storage structures;

(f) transmitting the one or more data cells corresponding to the active channels identified by the plurality of highest priority tokens;

(g) rescheduling the plurality of highest priority tokens back into the storage structure for subsequent selection; and (h) performing steps (d) through (g) in a looping manner to serially transmit several data cells.

2. The method of claim 1 wherein the step (a) comprises:
   providing a plurality of queues as the plurality of storage structures wherein one queue in the plurality of queues schedules new tokens and allows tokens to be selected in a first-in-first-out manner.

3. The method of claim 1 wherein the communication system is an asynchronous transfer mode (ATM) system.

4. The method of claim 1 wherein the step (a) comprises:
   providing the plurality of storage structures having a first sub-set of storage structures which are transmit structures wherein tokens are selected from these transmit structures in the step (e) and another sub-set of storage structures are waiting structures which store tokens which cannot be selected but instead are waiting to be shifted into a transmit structure via the step (d).

5. The method of claim 1 wherein the step (a) comprises:
   providing the plurality of storage structures wherein a first sub-set of the plurality of storage devices has a first priority and a second sub-set of the plurality of storage devices has a second priority which is lower than the first priority.

6. The method of claim 1 wherein the step (f) comprises:
   transmitting a plurality of ATM data cells corresponding to a plurality of different ATM data channels wherein each ATM data cell consumes a transmit cycle period in a grouped plurality of transmit cycle periods which are allotted for a physical transmit media within a given period of time.

7. The method of claim 1 wherein the plurality of channels comprises a channel selected from a group consisting of: an ATM virtual connection and an ATM virtual path.

8. The method of claim 1 wherein the plurality of storage structures are queues which are numbered from 0 to N in a rank order with a lower number indicating a higher priority, the step (g) comprising:
   rescheduling one highest priority token to the storage structures using the equation NQN=CQN+constant
   wherein NQN=new queue number and
   CQN=current queue number.

9. The method of claim 8 wherein the constant is transmit period number determined by a bandwidth of data transmitted for a particular channel.

10. The method of claim 1 wherein during step (h) a new active channel is added to the communication system and a new token is stored in the plurality of storage structures.

11. The method of claim 1 wherein during step (h) a channel is made inactive and a corresponding token removed from the plurality of storage structures.

12. The method of claim 1 wherein the plurality of storage structures are structures which are numbered from 0 to N in a rank order with a lower number indicating a higher priority and the step (d) comprises:
   shifting each token from a rank-order structure M to a rank-ordered structure M-1 wherein M is a finite positive integer between 0 and N.

13. The method of claim 1 wherein the plurality of storage structures are structures which are numbered from 0 to N in a rank order with a lower number indicating a higher priority and the step (e) comprises:
   beginning to select tokens from a structure having a lowest rank order and progressing to a structure having the a predetermined rank order which is greater than the lowest rank order.

14. The method of claim 1 wherein the plurality of storage structures are structures which are numbered from 0 to N in a rank order with a lower number indicating a higher priority and the step (e) comprises:
   shifting any unselected token remaining in a rank order queue 0 to an error checker for error processing.

15. The method of claim 1 wherein the step (g) comprises:
   rescheduling a token to a same storage structure in the plurality of storage structures to enable a burst mode transmission capability.

16. A method for transmitting asynchronous transfer mode (ATM) data cells in an asynchronous transfer mode (ATM) system, the method comprising:

(a) providing a plurality of queues wherein a first sub-portion of the plurality of queues are waiting queues and a second sub-portion of the plurality of queues are transmit queues, each queue in the plurality of queues being of a rank order wherein lower rank queues comprise the transmit queues and higher rank queues comprises the waiting queues;

(b) activating a plurality of active channels in the ATM system;

(c) creating a token for each active channel in the plurality of active channels;

(d) initially placing each token for each active channel into one of the waiting queues;

(e) shifting all tokens in the queues from a current queue in which the tokens reside to a queue having a lower rank;

(f) determining if any token reside in transmit queues;

(g) repeating steps (e) through (f) if no tokens reside in transmit queues in the step (f);

(h) selecting at least one token from the transmit queues if a token resides in the transmit queues from step (f);

(i) transmitting at least one ATM data cell on at least one channel which corresponds to the at least one token;

(j) rescheduling the at least one token into a queue in the plurality of queues; and (k) performing steps (e) through (j) in a looping manner.

17. The method of claim 16 wherein the step (j) comprises:

storing the token to a same queue from which it was selected to enable a burst transmission mode.

18. The method of claim 16 wherein the plurality of queues are numbered from 0 to N in a rank order with a lower number indicating a higher priority, the step (j) comprising:

rescheduling the at least one token using an equation identified by NQN=CQN+constant wherein NQN=new queue number and CQN=current queue number.

19. The method of claim 16 wherein step (i) comprises:

sending a plurality of ATM data cells corresponding to a plurality of selected tokens from step (h) wherein each ATM data cell is sent on a single physical communication line.

20. A method for scheduling asynchronous transfer mode (ATM) data cells for transmission in an asynchronous transfer mode (ATM) system, the method comprising:

providing a data structure having a plurality of storage elements for storing a plurality of tokens, the storage elements being referred to as storage element 0 to storage element N, wherein N storage elements are provided in the data structure with N being a finite positive integer;

placing the plurality of tokens into the data structure wherein the each token in the plurality of tokens correspond to one channel in the ATM system;

shifting the plurality of tokens in the data structure from one storage element to another storage element and transmitting at least one selected ATM data cell in response to selected tokens which are determined in response to the shifting, the tokens which are selected tokens being rescheduled to the data structure.

21. The method of claim 20 wherein the step of shifting further comprises:

rescheduling at least one selected token within the selected tokens back into a reschedule storage element within the plurality of storage elements in the data structure so that subsequent selection of the at least one selected token is possible with more shifting of the tokens.

22. The method of claim 20 wherein the step of shifting further comprises:

storing a single token from the selected tokens to a same storage element from which it was selected to enable a burst transmission mode wherein a burst transmission mode is where the single token is selected repeatedly for a plurality of sequential time periods.

23. The method of claim 20 wherein the storage elements are queues which are numbered from 0 to N in a rank order with a lower number indicating a higher priority, the step of shifting comprising:

rescheduling a selected token using an equation identified by NQN=CQN+constant wherein NQN=new queue number and CQN=current queue number.

24. The method of claim 20 wherein step of shifting comprises:

sending a plurality of ATM data cells corresponding to a plurality of selected tokens wherein each ATM data cell is sent on a single physical ATM communication line.

25. An asynchronous transfer mode (ATM) system comprising:

an ATM data processor;

an ATM memory space coupled to the data processor and having both a control program and a plurality of queues, the plurality of queues being used to store tokens which correspond to one or more ATM channels and the control program being used to manipulate positioning of the tokens in the queues by moving tokens from one queue to another queue in the queues, the control program selecting certain tokens out of the queues, the selecting of the certain tokens allowing ATM data cells which are identified by the certain tokens and correspond to various ATM data channels to be communicated via a physical media within the ATM system in response to a transmit enable command from the ATM data processor.

26. A method for transmitting a plurality of asynchronous data transfer mode (ATM) data cells in an ATM data processing system, the method comprising the steps of:

representing each active ATM connection in the ATM data processing system by an ATM pointer;

placing the ATM pointers into current locations of a data structure-wherein the data structure contains a plurality of queues where in each queue is allowed to contain a plurality of ATM pointers, the plurality of queues being priority ordered from a high priority to a low priority;

shifting the ATM pointers from the current locations to new locations wherein the new locations are of a higher priority than the current locations;

selecting ATM pointers from the new locations to form a set of selected pointers, the set of selected pointers being chosen from queues that have a relatively high priority;

using the selected pointers to identify a plurality of selected ATM data cells in the ATM data processing system which correspond to respective active ATM connections;

transmitting the plurality of selected ATM data cells via the active ATM connections; and rescheduling the set of selected pointers to one or more queues in the plurality of queues that have a relatively low priority.

27. A method for transmitting data cells in a communication system, the method comprising the steps of:

(a) selectively activating or deactivating a plurality of connections in the communication system to create a plurality of active connections;

(b) representing the plurality of active connections by creating a token for each active connection in the plurality of active connections, each token identifying one active connection;

(c) placing the tokens into a data structure having a plurality of positions wherein the positions are priority ranked from a high transmission priority to a low transmission priority;

(d) shifting the tokens from low transmission priority positions to high transmission priority positions over time;

(e) selecting tokens from the high transmission priority positions over time and transmitting data cells via the plurality of active connections in response to the selecting of tokens from the high transmission priority positions, the tokens selected from the high transmission priority positions being rescheduled to low transmission priority positions after selection;

(f) performing steps (a) through (e) as needed to continue transmission of data cells.

28. A data structure for use in a communication data processing system, the data structure comprising:

a plurality of queues stored in memory and accessible by a central processor, each queue being able to store multiple tokens wherein each token identifies a transmission that is to occur in the communication processing system, the plurality of queues having priorities that vary from high priority to low priority, the identifiers being shifted over time from low priority queues to high priority queues wherein tokens eventually are shifted into at least one predetermined high priority queue where tokens are selected as selected tokens from the at least one predetermined high priority queue in a first-in-first-out manner when more than one token is resident in the at least one predetermined high priority queue, the selected tokens indicating transmissions that are to occur in the communication data processing system.

29. The data structure of claim 28 wherein the selected tokens are stored into low priority queues after being selected.

30. A data structure for use in an asynchronous transfer mode (ATM) communication system, the data structure comprising:

a plurality of queues stored in memory and accessible by a central processor, each queue being able to store multiple pointers wherein each pointer identifies an ATM transmission through a particular ATM data channel, the plurality of queues having priorities that vary from high priority to low priority wherein the pointers are shifted over time from low priority queues to high priority queues, the pointers are eventually shifted to a point in the plurality of queues where some pointers become selected pointers, the selected pointers being used to invoke ATM data cell transmissions through the ATM communication system.

* * * * *